US006519003B1

(12) United States Patent
Swayze

(10) Patent No.: US 6,519,003 B1
(45) Date of Patent: Feb. 11, 2003

(54) CAMERA WITH COMBINATION FOUR-WAY DIRECTIONAL AND MODE CONTROL INTERFACE

(75) Inventor: Samuel F. Swayze, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/048,416

(22) Filed: Mar. 26, 1998

(51) Int. Cl.7 .................................................. H04N 5/225
(52) U.S. Cl. .................................. 348/375; 348/333.01
(58) Field of Search ................................. 348/207, 220, 348/222, 373, 374, 375, 333.01, 333.02, 333.05, 333.06, 333.11, 333.12; 345/156, 157, 161; D16/200, 201, 202; H04N 5/225

(56) References Cited

U.S. PATENT DOCUMENTS

| | | | |
|---|---|---|---|
| 5,430,511 A | | 7/1995 | Paff et al. |
| 5,486,852 A | * | 1/1996 | Arai ........................... 348/211 |
| 5,649,245 A | | 7/1997 | Inoue et al. |
| 5,815,205 A | * | 9/1998 | Hashimoto et al. ......... 348/373 |
| 5,978,016 A | | 11/1999 | Lourette et al. |
| 6,147,203 A | | 11/2000 | Miller |
| 6,310,703 B1 | | 10/2001 | Miller et al. |

OTHER PUBLICATIONS

Fuji FinePix 700 camera (Feb. 12, 1998).*
FujiFilm Home Index Press Market Info–Bureau Plaza on Internet address http://www.fujifilm.co.jp/news_r/nrj322.html, Feb. 12, 1998 and product literature for Fuji FinePix 700 camera.

* cited by examiner

Primary Examiner—Tuan Ho
(74) Attorney, Agent, or Firm—David M. Woods

(57) ABSTRACT

An electronic camera for capturing, viewing and manipulating electronic image data includes a processor for operating the camera in a plurality of modes, a display device for generating image components including one or more captured images derived from the electronic image data and a set of graphical elements, and a single controller that intuitively allows the user to cycle through the available displayed choices and options with a minimum of hassle. The controller includes a control element separated into four directional components arranged around a central axis and operative with the display device for navigating among the image components and a mode dial coaxial with the control element for selecting one of the modes.

20 Claims, 3 Drawing Sheets

CAMERA WITH COMBINATION FOUR-WAY DIRECTIONAL AND MODE CONTROL INTERFACE

CROSS-REFERENCE TO RELATED APPLICATION(S)

Reference is made to commonly assigned copending applications Ser. No. 08769,573, entitled "Electronic Camera with Image Review" and filed Dec. 19, 1996 in the names of Michael E. Miller and Richard E. Lourette; and Ser. No. 08/928,146, entitled "User Interface for Electronic Image Viewing Apparatus" and filed Sep. 12, 1997 in the names of Michael E. Miller, Richard W. Lourette, Peter C. Fellegara, Carolyn A. Bussi, Michael J. Telek, Matthew E. Hunter, and Duncan R. Kerr; and Ser. No. 08/803,338, entitled "Electronic Camera with Internal Fixed Album Memory" and filed Feb. 20, 1997 in the names of Richard W. Lourette, Peter Fellegara, Michael E. Miller, and Linda M. Antos, each of which are assigned to the assignee of this application.

FIELD OF THE INVENTION

The invention relates generally to the field of electronic photography, and in particular to a user interface for an electronic camera that is connectable to a computer and capable of image viewing and editing.

BACKGROUND OF THE INVENTION

When designing an electronic camera, the human interface with the camera must support the operational functions of the camera, as well as the selection and viewing of captured images. As used herein, the human (or user) interface refers to the totality of the human interaction with the system, and the means for enabling such interaction, e.g., including the information presented by the system to the user, and by the user to the system, as well as the devices that enable such presentations. The system must also provide the ability to select among operational functions, as well as apply actions against these images, such as magnifying the images, deleting the images, or sharing the images via a display device. Such a system will often employ a very small display and limited area for user controls; therefore, it is important for the user interface to have as few buttons and switches as possible, to present images that are visible on the small display, and to encourage interaction that is as intuitive as possible so as to tie usage of the buttons and switches on the camera to the graphics on the display.

In copending Ser. No. 08/928,146, a user interface, including on screen graphics and user controls, is shown in relation to a digital electronic camera. Referring to FIG. 1, the digital camera 10 is seen from a rear view, and includes an optical viewfinder 12, a zoom lens control switch 14, a handgrip area 18, and a screen operation control unit 20, all mounted on a camera housing 21. More specifically, the screen operation control unit 20 includes a liquid crystal display (LCD) 22, first user interface controls comprising respective forward and backward image scroll buttons 24, 26 and second user interface controls comprising respective previous and next menu select buttons 28, 30, and an enter button 31.

The forward, backward image scroll buttons 24, 26 are positioned such that the direction of user engagement is oriented parallel to a first set of graphical elements 32, which in the preferred embodiment include a strip of captured images retrieved from a list of images stored in the camera's memory. The previous and next menu select buttons 28, 30 are positioned such that the direction of user engagement is oriented parallel to a second set of graphical elements 34, which in the preferred embodiment is a menu bar including a number of operations or functions 1 . . . 4 that may be performed on a selected one of the images displayed in the image strip. Consequently, the direction of user engagement of the forward, backward buttons 24, 26 and the previous, next buttons 28, 30 are oriented substantially orthogonal to each other so as to intuitively integrate user interaction with the visual presentation of the first and second sets of graphical elements 32, 34. Relatively lower resolution images are displayed in the frame areas of the first set of graphical elements 32, and a single relatively higher resolution image is displayed in the display area 35 that is not obscured by the graphical elements 32, 34. It is preferable to have the higher resolution image in the display area 35 to be as large as possible, and at least as large as fifty per cent of the whole area of the display 22. Furthermore, a lower resolution image corresponding to the higher resolution image is shown in a preferred position 33 in the first set of graphical elements 32. A known camera of the type described in Serial No. 08/928,146 further includes a dial 36 for selecting one of a plurality of operational modes, which are identified in FIG. 1 as modes "A", "B", "C", and "D". Such modes may include the functions of capturing an image, reviewing captured images, connecting to a computer, and so on.

In copending Ser. No. 08/803,338, a color display unit is provided on the back of the camera housing, and an edit switch and a directional switch unit is provided adjacent to the display unit. The directional switch unit is a four directional thumbpad segmented into four different individual directional switches. The user can then manually scroll through digital film images in forward and reverse directions by utilizing the right and left directional segments of the thumbpad. In this mode, each image is shown individually as the user scrolls through the stored images. In a separate edit level, the edit switch is activated and a functional icon group is displayed. Then the user can utilize the up and down directional segments of the thumbpad to advance through the displayed function icons until the desired icon is highlighted.

In copending Ser. No. 08/769,575, an electronic camera stores captured images and allows a user to relatively rapidly review any desired stored image, and to do so without repetitive actions. The camera displays a large image on its display device and a strip of low resolution images, including one in a preset strip position corresponding to the large image. The user can then navigate backwards and forward through the strip of images in the camera's storage device by pressing a forward button or a reverse button arrayed adjacent to the display device. If the user simply presses and releases the forward or reverse buttons, the low resolution images in the strip advance or reverse by one image, and the next corresponding large image is displayed.

None of the foregoing systems integrate mode selection, such as capture, connect (to a host computer), and review (of captured images), with directional navigation, such as up/down and left/right, into a single control presentation that intuitively allows the user to cycle through the available choices and options with a minimum of hassle.

SUMMARY OF THE INVENTION

The present invention is directed to overcoming one or more of the problems set forth above. Briefly summarized, according to one aspect of the present invention, an electronic camera for capturing, viewing and manipulating electronic image data includes a processor for operating the camera in a plurality of modes, a display device for generating image components including one or more captured images derived from the electronic image data and a set of graphical elements, and a single controller that intuitively allows the user to cycle through the available displayed choices and options with a minimum of hassle. The controller includes a control element separated into four directional components arranged around a central axis and operative with the display device for navigating among the image components and a mode dial coaxial with the control element for selecting one of the modes.

Despite the simplicity of the interface, the invention provides the advantage of optimizing one-hand (e.g., right-hand) one-finger (e.g., thumb) access to each of the directional and mode controls without compromising access to any one of them. It reduces crowding, visual clutter, and perceived complexity, as well as maximizing the 'clear' area on the camera back to minimize risk of the other (e.g., left) hand interfering with a control while gripping the camera. This interface can be applied to both electronic cameras with an electronic display, as well as any device that can be used for image viewing and editing.

The invention further provides the advantage of a user interface that includes a minimal set of controls which are integrated with on-back callouts and on-screen graphics in a manner as to reduce the apparent complexity and to increase the ease of using the device employing the interface. The interface provides strong spatial cues that line up the on-screen graphics with the user controls. This association of graphics and callouts with user controls provides an intuitive method of interacting with an image viewing and editing device.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because digital cameras employing electronic sensors, as well as electronic processing and storage, are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed to practice the invention is conventional and within the ordinary skill in such arts.

Figure 2:
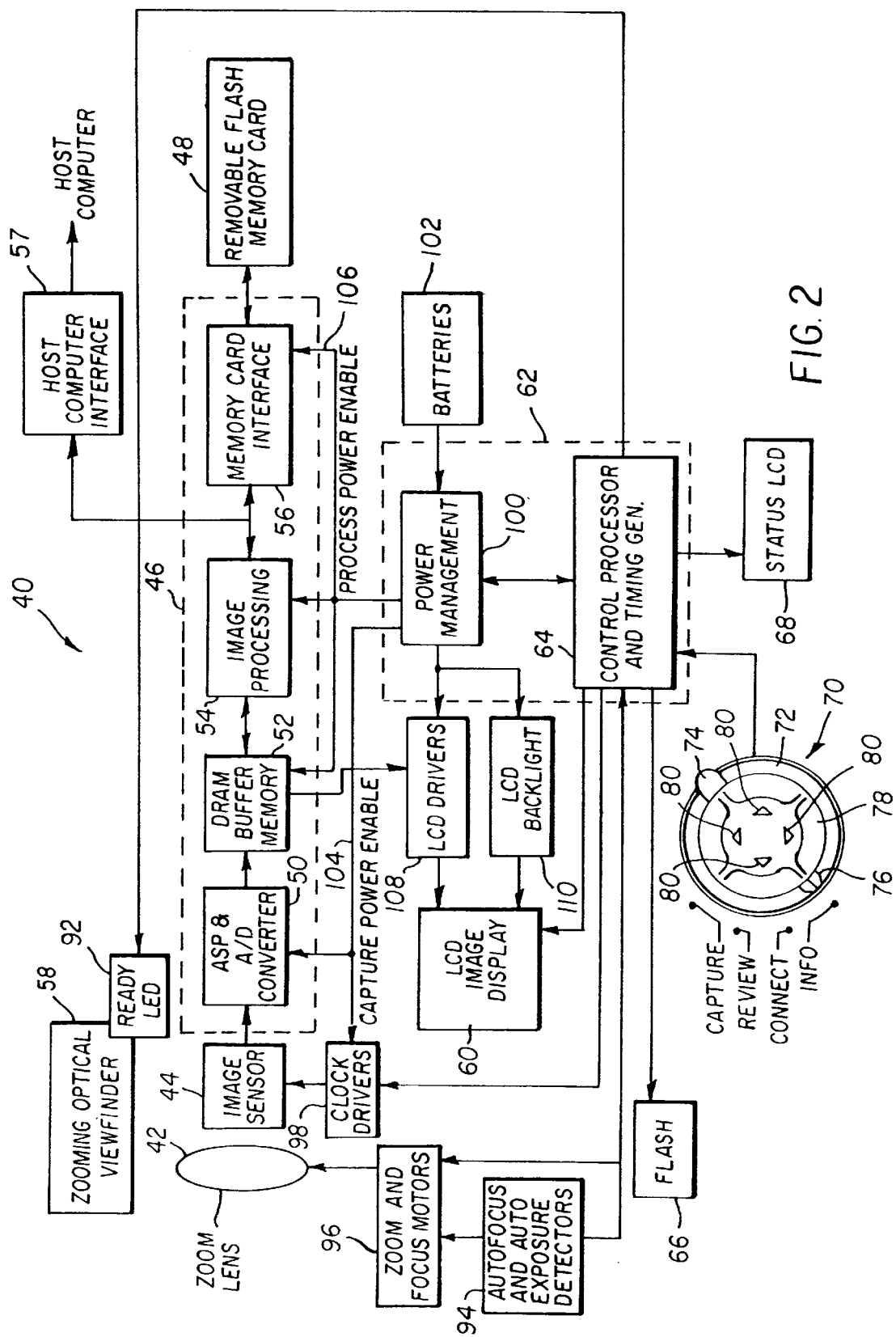
FIG. 2 is a block diagram of a digital camera including a combination four-way directional and mode control according to the invention.

Referring now to FIG. 2, a digital camera 40 includes a zoom lens section 42 for directing image light toward an image sensor 44, a processing section 46, and a removable output memory 48, such as a flash memory card. The image sensor 44 is typically a color sensor, and includes a color filter array, such as the well-known Bayer pattern (see U.S. Pat. No. 3,971,065). The processing section 46 includes an analog signal processing and A/D converter 50, a DRAM buffer memory 52, an image processing section 54 (which may be a programmable DSP capable processor, such as a Hitachi SH-DSP processor), and an output interface 56 to the removable memory 48. In addition, the camera includes a host computer interface 57 for directly connecting the camera 40 to a host computer, for example, to download images.

The DRAM buffer memory 52 has sufficient memory space for at least one full resolution image captured by the image sensor 44. The camera 40 also includes a zooming optical viewfinder 58, an image liquid crystal display (LCD) 60, a control section 62 including a control processor and timing generator 64, a flash unit 66, a status LCD 68, and a user interface comprising a group of user controls including a combination control 70. The control processor and timing generator 64, either by itself or in combination with the processing section 46, operates the camera in a variety of modes, e.g., to capture images, to review captured images, to connect to an external computer, and so on, and provides a set of graphical elements for the user interface (e.g., the elements 32 and 34 described in connection with FIG. 1), which may change depending on the mode selected.

In the preferred embodiment, the combination control 70 includes a disk-shaped select button 78 surrounded by a mode dial 72, which further includes a knob 74 and a pointer 76. One of the aforementioned modes, including "capture", "review"(of captured images), "connect"(to a host computer), is selected by positioning the pointer 76 opposite the selected mode. The mode dial 72 comprises an outer ring surrounding the inner select button 78, which includes markers 80 for selection of four separate directions. As shown in cross section in FIG. 4, the mode dial 72 is captured between a rear cover 82 of the camera and a socket 84 such that switch contacts 86 engage a switching pattern (not shown) on a printed circuit board (PCB) 88 in order to enable a selected mode. The select button 78 is mounted atop a multi-function tactile switch 90 so as to be tilted in different directions and provide a different output signal to the PCB 88 for each direction of movement.

Nearby, or within, the optical viewfinder is a ready light 92 that is connected to the control processor and timing generator 64. A set of autofocus and autoexposure detectors 94 provide data to the control processor and timing generator 64 for driving zoom and focus motors 96 connected to the zoom lens 42, and for initiatng an exposure by enabling clock drivers 98 in order to activate the image sensor 44.

The control section 62 further includes a power management controller 100, which is connected to the control processor and timing generator 64 for conserving power demands by the various components of the camera 40. Power supplied by batteries 102 is applied on demand to the clock drivers 98, the processing section 46, and the image LCD 60. More specifically, a capture power enable line 104 supplies power to the clock drivers 98 and the analog signal processing and A/D converter 50 and a separate process power enable line 106 supplies power to the DRAM buffer memory 52, the image processing section 54, and the memory card interface 56. The power management controller 100 also enables LCD drivers 108 to input data from the DRAM buffer memory 52 to the image LCD 60, and further enables an LCD backlight 110 to provide a variable amount of backlight to the image on the image LCD 60. In the preferred embodiment, the image LCD 60 is a color LCD for displaying color images.

Figure 1:
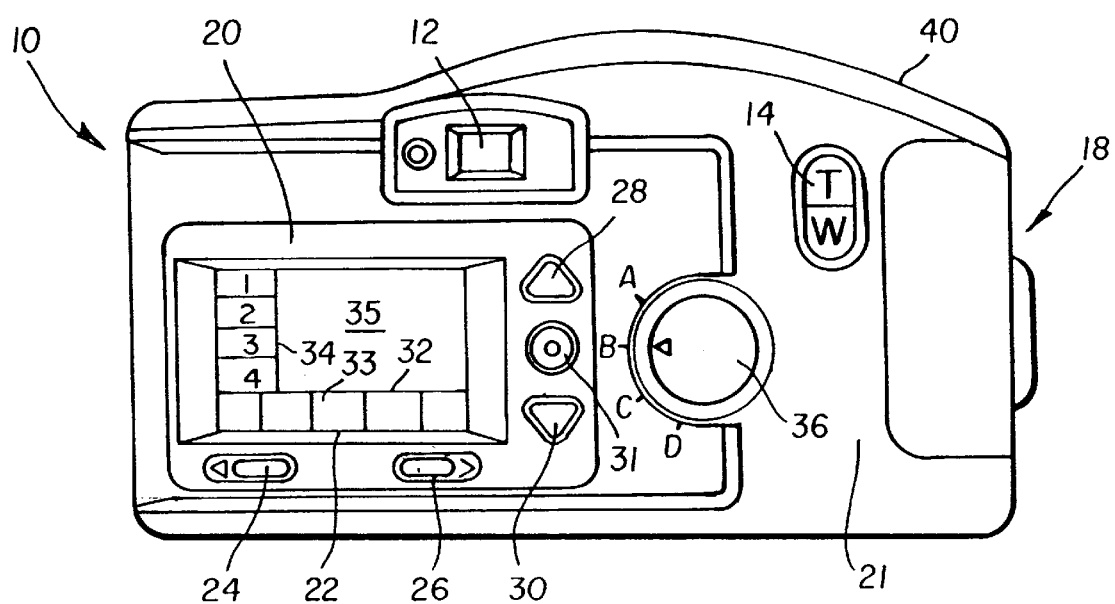
FIG. 1 is a view of a back of an electronic camera employing a user interface according to the prior art.
Figure 3:
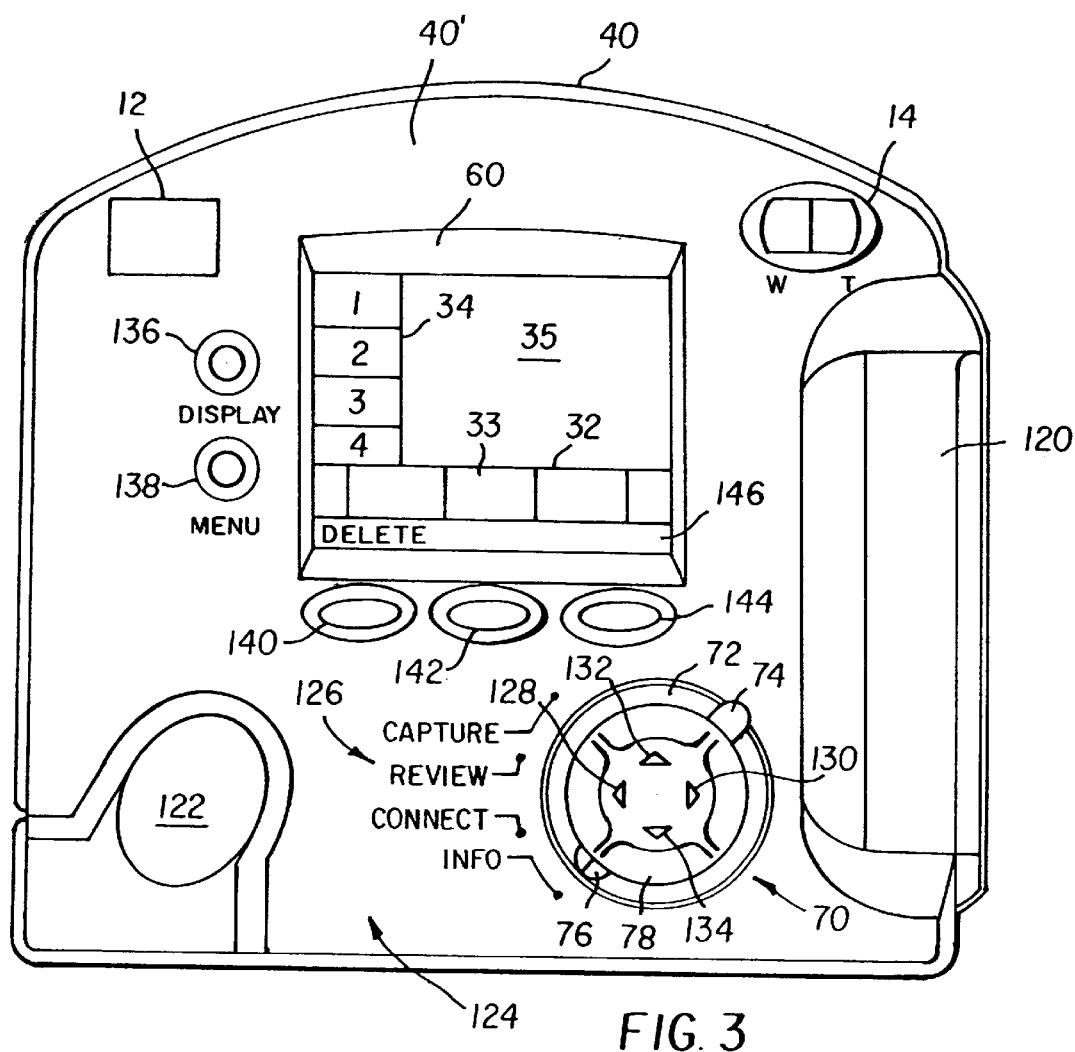
FIG. 3 is a view of an electronic camera using the four-way control shown in FIG. 2 according to the invention.

FIG. 3 shows a view of a back surface 40' of the digital camera 40 showing the combination four way directional and mode control interface according to the invection (features common to FIGS. 1, 2 and 3 retain the same reference characters). The back of the camera 40 includes a right-hand grip 120 and a left thumbgrip 122. The combination control 70 is positioned relative to the right-hand grip 120 so as to optimize right-hand thumb access to the mode dial 72 and to the select button 78. The combination control 70 is also positioned in a rightward location to maximize a clear area 124 on the camera back 40 to minimize the risk of the left hand interfering with one of the controls while gripping the camera 40.

Figure 4:
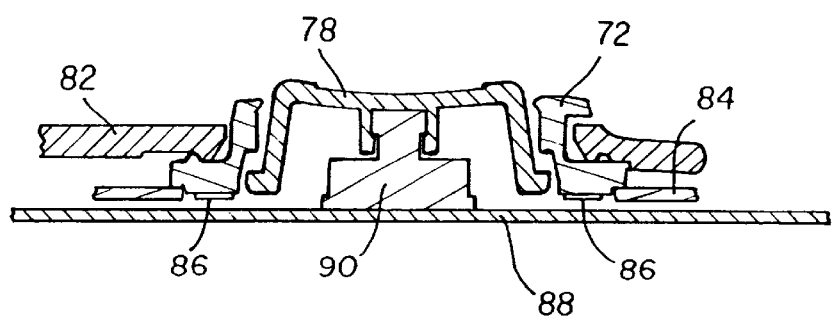
FIG. 4 is a cross section of the combination four-way directional and mode control as shown in FIGS. 2 and 3.

The mode dial 72 constitutes an outer ring mounted on the circumferential exterior of the combination control 70. This outer ring may be plastic or metal with, e.g., a bright, metallic finish. The ring may be narrow or wide, but would preferably feature two protrusions: the knob 74 to serve as a 'lever' to facilitate turning the mode dial, particularly by use of the right thumb; and the pointer 76 to indicate the mode selection from a group of mode callouts 126. The mode callouts 126 would preferably be printed on the camera back 40', and possibly color-coded as well. The select button 78 includes four raised actuation points: left/right actuation points 128/130 and up/down actuation points 132/134. These points may be formed on a single select button, such as shown in FIG. 4, or may constitute separate button segments; in either case, the actuation points 128/130 and 132/134 are used to navigate among the image components displayed on the display 60, that is, among the captured images or the graphical elements. The button area may be plastic (hard) or elastomeric (soft) material. The actuation points 128/130 and 132/134 would be biased toward the outer perimeter of the circular inner area to ensure adequate tactile separation between contact points. Color and finish of the select button(s) 78 might be anything desirable, but would be designed so as not to supersede the visual dominance of the mode dial.

The camera back 40' also includes a display button 136, which is pressed in order to turn on the display 60, and a menu button 138, which is pressed to cycle among various menus for a given mode selected by the mode dial 72. Three soft keys 140, 142 and 144 are provided on the camera back 40', and access changeable functions dependent upon the menu selection. Text describing the functions is written in a bar 146 along the bottom of the display 60. For instance, FIG. 3 shows the left key 140 active as a delete function in the info mode (i.e., all keys are not used in each menu selection).

The left/right actuation points 128/130 are positioned such that the direction of user engagement is oriented parallel to the first set of graphical elements 32, which may include a strip of captured images retrieved from a list of images stored in the camera's memory. The up/down actuation points 132/134 are positioned such that the direction of user engagement is oriented parallel to the second set of graphical elements 34, which may be a menu bar including a number of operations or functions 1... 4 that may be performed on a selected one of the images displayed in the image strip. Consequently, the direction of user engagement of the left/right actuation points 128/130 and the up/down actuation points 132/134 are oriented substantially orthogonal to each other so as to intuitively integrate user interaction with the visual presentation of the first and second sets of graphical elements 32, 34. Relatively lower resolution images are displayed in the frame areas of the first set of graphical elements 32, and a single relatively higher resolution image is displayed in the display area 35 that is not obscured by the graphical elements 32, 34. Furthermore, a lower resolution image corresponding to the higher resolution image is shown in a preferred position 33 in the first set of graphical elements 22.

The invention has been described with reference to a preferred embodiment. However, it will be appreciated that variations and modifications can be effected by a person of ordinary skill in the art without departing from the scope of the invention.

PARTS LIST 10 camera
12 optical viewfinder
14 zoom lens control switch
18 handgrip area
20 screen operation control unit
21 camera housing
22 LCD
24 forward image scroll button
26 backward image scroll button
28 up menu select button
30 down menu select button
31 enter button
32 first set of graphical elements
33 preferred position
34 second set of graphical elements
35 display area
36 dial
40 digital camera
42 zoom lens section
44 image sensor
46 processing section
48 removable output memory
50 analog signal processor and A/D converter
52 RAM buffer memory
54 image processing section
56 card interface
57 host computer interface
58 zooming optical viewfinder
60 image LCD
62 control section
64 control processor and timing generator
66 flash unit
68 status LCD
70 combination control
72 mode dial
74 knob
76 pointer
78 select button
80 markers
82 rear cover
84 socket
86 switch contacts
88 printed circuit board
90 multi-function tactile switch
92 ready light
94 autofocus and autoexposure detectors
96 zoom and focus motors
98 clock drivers
100 power management controller
102 batteries
104 capture power enable line 106 process power enable line
108 LCD drivers
110 LCD backlight
120 right-hand grip
122 left-thumb grip
124 clear area
126 mode callouts
128 left actuation point
130 right actuation point
132 up actuation point
134 down actuation point
136 display button
138 menu button
140 soft key
142 soft key
144 soft key
146 bar

What is claimed is:

1. An electronic camera for capturing, viewing and manipulating electronic image data, said apparatus comprising:
  a processor for operating the camera in a plurality of modes;
  a display device for generating image components including one or more captured images derived from the electronic image data and a set of graphical elements;
  a control element separated into four directional components arranged around a central axis and operative with the display device for navigating among the image components; and
  a mode dial coaxial with the control element for selecting one of the modes.

2. A camera as claimed in claim 1 wherein the control element is an inner disk including the four directional components and the mode dial is an outer ring positioned around the inner disk.

3. A camera as claimed in claim 1 wherein the directional components include up/down controls for navigating up/down among the image components and left/right controls for navigating left/right among the image components.

4. A camera as claimed in claim 1 wherein the camera includes a housing having a handgrip and the control element and the mode dial are positioned on the housing so that they are accessible to a thumb when the handgrip is grasped.

5. A camera as claimed in claim 4 wherein the mode dial includes a knob that is accessible to the thumb.

6. A camera as claimed in claim 1 wherein the processor is operable in a capture mode, and the mode dial allows selection of a capture mode.

7. A camera as claimed in claim 1 wherein the camera is connectible to a host computer, the processor is further operable in a mode connecting the camera to the host computer, and the mode dial allows selection of a connect mode that connects the camera to the host computer.

8. A camera as claimed in claim 1 wherein the processor is further operable in a review mode for reviewing captured images, and the mode dial allows selection of a review mode for reviewing captured images.

9. A camera as claimed in claim 1 wherein the directional components are user engageable buttons arranged in a circular pattern around the central axis.

10. A camera as claimed in claim 1 wherein the directional components are elements of a tactile switch that is covered with a button that can be tilted in different directions to engage the separate components.

11. A camera as claimed in claim 1 wherein the set of graphical elements vary depending on the selected mode.

12. An electronic camera for capturing, viewing and manipulating electronic image data corresponding to one or more images, said apparatus comprising:
  a processor for operating the camera in a plurality of operational modes;
  a display device for generating a displayed image from the electronic image data, and for further displaying first and second sets of graphical elements, said first set oriented in a direction substantially orthogonal to the second set of graphical elements;
  a circular control element arranged around a central axis, said control element including a first user control in which the direction of user engagement is oriented parallel to the first set of graphical elements for initiating one or more operations represented by the first set of graphical elements; and a second user control in which the direction of user engagement is oriented parallel to the second set of graphical elements for initiating one or more operations represented by the second set of graphical elements, wherein the directions of user engagement for the first and second user controls are oriented substantially orthogonal to each other so as to intuitively integrate user interaction with the visual presentation of the first and second sets of graphical elements; and
  a mode dial coaxial with the control element for selecting one of the modes.

13. A camera as claimed in claim 12 wherein the first user control comprises two directional controls that are oriented parallel to the first set of graphical elements for initiating one or more operations represented by the first set of graphical elements.

14. A camera as claimed in claim 13 wherein the second user control comprises two directional controls that are oriented parallel to the second set of graphical elements for initiating one or more operations represented by the second set of graphical elements.

15. A camera as claimed in claim 14 wherein the directional controls are user engageable buttons arranged in a circular pattern around the central axis.

16. A camera as claimed in claim 14 wherein the directional controls are elements of a tactile switch that is covered with a button that can be tilted in different directions to engage the separate controls.

17. A camera as claimed in claim 12 wherein the first set of graphical elements includes a plurality of pictorial elements presented in the form of a filmstrip.

18. An apparatus as claimed in claim 17 wherein said display device generates a larger rendition of an image and the pictorial elements included in the first set of graphical elements provide a plurality of smaller images in the form of a filmstrip including one smaller image that corresponds to the larger image.

19. An apparatus as claimed in claim 12 wherein the second set of graphical elements is a plurality of operations presented in the form of a menu bar.

20. A graphical user interface operable with an image capture device for selecting and viewing electronic image data corresponding to one or more images, and for controlling the presentation and editing of the images, said interface comprising:
  a display device for generating at least one displayed image from the electronic image data, said display device usable with the capture device in a plurality of operational modes, including a capture mode, a review mode, and a mode for connecting to an external computer;

means for producing on the display device first and second sets of graphical elements arranged orthogonal to each other, said first set including pictorial elements representing low resolution versions of a plurality of electronic images including the displayed image and said second set including graphical symbols identifying a plurality of operations that can be carried out on the displayed image;

a first set of two directional controls that are arranged on a first axis parallel to the first set of graphical elements in order to scroll through the low resolution versions of the electronic images;

a second set of two directional controls that are arranged on a second axis parallel to the second set of graphical elements in order to select an operation;

a user input element grouping the first and second set of directional controls together relative to a single central axis, so as to provide actuable sections arranged around the central axis in a circle, thereby intuitively integrating user interaction with the visual presentation of the first and second sets of graphical elements; and a mode dial coaxial with the user input element for selecting one of the operational modes.

* * * * *